May 15, 1962 G. LABA 3,034,250
FISH HOOK HAVING BAIT RETAINING MEANS
Filed Feb. 5, 1960
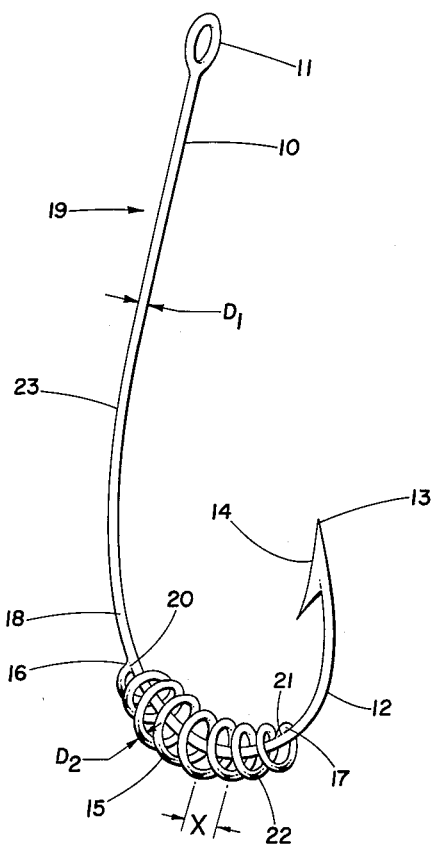
*Inventor*
GEORGE LABA
by: Cavanagh & Norman 3,034,250
FISH HOOK HAVING BAIT RETAINING MEANS
George Laba, 1370 King St. W., Toronto,
Ontario, Canada
Filed Feb. 5, 1960, Ser. No. 7,033
4 Claims. (Cl. 43—44.8)

This invention relates to a fish hook having bait retaining means of the form set forth and particularly described herein.

Skilled fishermen are adept at placing worms on fish hooks. A certain skill and dexterity is developed by sporting fishermen in the baiting of hooks and results in various preferred methods being employed for placing the worm on the hook, having regard to the type of fishing being done, the kind of fish being lured, and the overall problem of retaining the worm on the hook.

Novice fishermen who now enjoy the sport in great numbers are often sensitive to the operation of placing the worm on the hook. In particular, large or fat worms tend to accentuate the squeamish feelings of the novice fisherman generally leading to lack of fishing success due to improper placing of the worm on the hook.

It is the main object of this invention to provide a fish hook having bait retaining means in a form specially adapted for use by the novice fisherman and enabling the placement of a worm on the hook in a simple winding operation with a minimum of torture to the worm in such a manner as to hold the worm securely on the hook.

Other objects of the invention will be appreciated from a study of the specification taken in conjunction with the accompanying drawing revealing a preferred form of the invention in detail.

The drawing shows an enlarged elevation of a preferred form of conventional fishing hook having mounted thereon the bait retaining means of the invention.

In the drawing, a preferred form of the hook structure of the invention is depicted. Shank 10 embodies at its upper end an eyelet 11 adapted to accommodate a fishing line therethrough. The lower depending hook portion or base curve portion 12 extends from shank 10 to a terminus 13 having thereon a barbed point structure 14 of conventional or other form.

According to the invention a wire spiral member 15 has its terminal ends 16 and 17 spiralled on a reduced radius to engage the wire body 18 of the base portion 12 of the hook structure 19. The terminal ends 16 and 17 may be fastened such as by soldering as at 20 and 21.

In use the worm may be pierced by the barbed point 14 and wound between the loops 22 of the wire spiral member 15 following the gaps between said loops and then the free end of the worm may again be pierced by the barbed point 14.

Many alternative methods of applying the worm to the hook will be evident to skilled fishermen. In all respects, however, multiple piercing of the worm such as to render it in a number of pieces is largely overcome if not entirely eliminated in most instances. In many cases the worm need not be pierced at all and, in fact, the mere winding of the worm into the spiral member has been found to be highly satisfactory for retaining the worm for most fishing purposes.

The hook structure 19 is formed of wire 23 of predetermined diameter $D_1$. The spiral member 15 is formed of wire of a lesser diameter $D_2$ preferably between about unity and one quarter diameter $D_1$. The internal diameter of the loops 22 for satisfactory worm gripping function should be of the order of about 2 to 5 diameters $D_1$ of wire 23. In addition, the space between adjacent loops of said spiral member, that is, the lateral dimension $x$, should be of the order of about three times the diameter of the wire used to form the spiral member, but again this spacing preferably is varied throughout the length of the spiral member. It will be observed that the spiral like member shown in the drawing converges in the diameter of the loops from a maximum of about five times the diameter of the wire 23 near the end 16 to substantially zero at the end 17. In addition, the pitch, or lateral dimension $x$, of the spiral is obviously progressively tightened toward the smaller end 17. By this means, the spiral member is enabled to grip various sizes of worms and other like bait.

Whereas the above description is directed to indicating the mode of baiting the improved hook of the invention with a worm, it is intended that the hook be employed to retain other types of bait including bacon, minnows, and the like.

Moreover, while what is thought at present to be a preferred embodiment of the invention has been disclosed herein, it will be appreciated that modifications and alterations may be effected without departing from the true spirit and scope of the invention as defined by the appended claims.

What I claim is:
1. A fishing hook structure having bait retaining means thereon and comprising in combination: a shank; a hook portion integrally formed with said shank and depending therefrom, said hook portion embodying a barbed point structure at the terminus thereof and a base portion intermediate of said shank and said barbed point structure; a spiralled member axially disposed about said base portion and embodying a plurality of loops, said loops being successively graduated in diameter and in pitch between the ends of said spiralled member; and means rigidly securing said ends of said spiralled member to said base portion.

2. The fishing hook structure defined in claim 1 in which said shank and said hook portion are formed of wire of predetermined diameter and said spiralled member is formed of wire of lesser diameter.

3. The fishing hook structure defined in claim 1 in which said loops are of an inner diameter between about two and five times the thickness of said shank and said hook portion.

4. The fishing hook structure defined in claim 2 in which said loops are of an inner diameter between about two and five times the thickness of said shank and said hook portion.

References Cited in the file of this patent
UNITED STATES PATENTS

| 2,454,879 | Mattingly | Nov. 30, 1948 |
| 2,482,721 | Sigmundi | Sept. 20, 1949 |
| 2,513,548 | Buss | July 4, 1950 |
| 2,531,995 | Sweetman | Nov. 28, 1950 |

FOREIGN PATENTS

| 369,346 | France | Nov. 8, 1906 |
| 985,975 | France | Mar. 21, 1951 |